April 12, 1949.                D. E. TRUCKSESS                2,467,347
                      REGULATED CURRENT SUPPLY APPARATUS
                              Filed Feb. 6, 1947
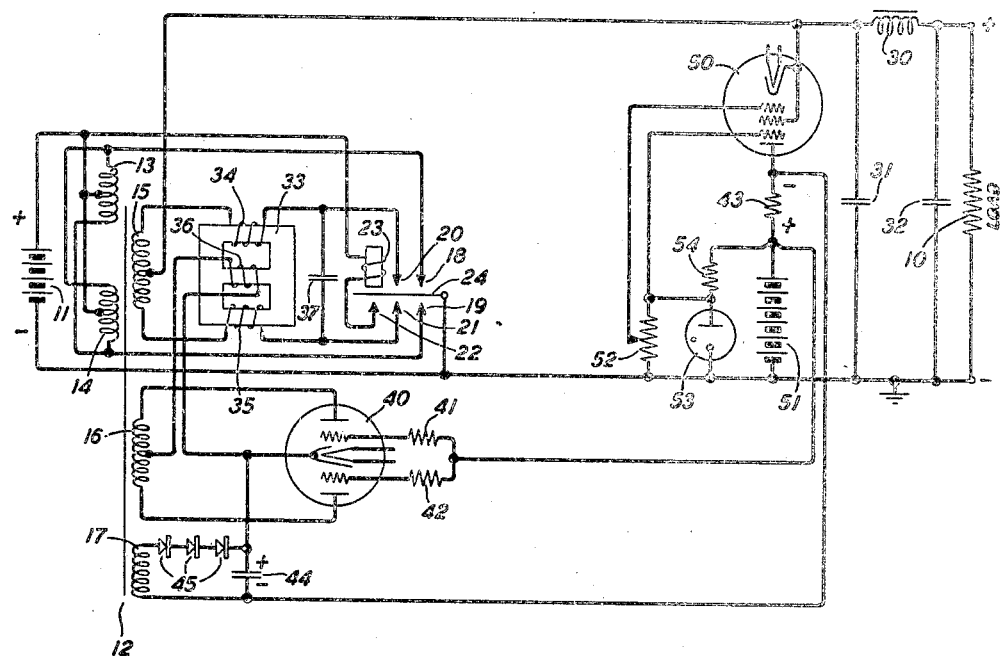
INVENTOR
D. E. TRUCKSESS
BY
ATTORNEY Patented Apr. 12, 1949

2,467,347

UNITED STATES PATENT OFFICE 2,467,347

REGULATED CURRENT SUPPLY APPARATUS

David E. Trucksess, Summit, N. J., assignor to Bell Telephone Laboratories, Incorporated, New York, N. Y., a corporation of New York Application February 6, 1947, Serial No. 726,881

9 Claims. (Cl. 323—15)

This invention relates to current supply apparatus and particularly to apparatus for regulating the direct current supplied to a load to maintain the load voltage substantially constant.

An object of the invention is to provide improved apparatus for regulating the voltage across a load to which direct current is supplied from a current supply source.

Another object of the invention is to provide improved apparatus for controlling the supply of direct current from a source to a load to maintain the load voltage substantially constant irrespective of voltage changes of the supply source.

The invention herein specifically shown and described for the purpose of illustration may be of use, for example, for supplying heating current to the filaments or cathodes of one or more space current devices of a radio transmitter or receiver from an automobile battery or from the battery of a farm lighting equipment. The voltage of such a battery may vary over a wide range such that, if current were supplied directly from the battery to the filaments of space current tubes, the useful life of the tubes would be considerably less than the normal average life. The voltage supplied by a nominally 32-volt farm lighting battery, for example, may vary from 29 to 40 volts, that is, from 9 per cent below to 25 per cent above the normal operating voltage. The filament voltage of a space discharge tube should not vary more than plus or minus 5 per cent in order to avoid a considerable reduction of the useful life of the tube.

In the current supply system shown and described herein, current from a battery is caused to flow in opposite directions alternately through the primary of a transformer to cause an alternating electromotive force to be set up across the secondary winding. Current supplied from the secondary winding is rectified and the rectified current is supplied to the load through a ripple filter. A vibrating reed relay is provided for periodically reversing the current supplied to the transformer primary and for rectifying the current supplied from the secondary winding to the load circuit. There is included in each current path through which current is supplied from the transformer secondary to the load a winding of a saturable reactor, the reactance of this winding being varied under control of a current supplied to a saturating winding of the reactor to thereby control the amplitude of the pulsating unidirectional current supplied to the load circuit including the ripple filter and thus to control the load voltage. A space current rectifier energized by current from a secondary winding of the transformer is provided for supplying rectified current to the reactor saturating winding under control of a control voltage having variations corresponding to load voltage changes impressed upon the control circuit of the rectifier. A direct current amplifier employing a space current device is provided for setting up the control voltage having the load voltage variations. Means are provided for impressing upon the control circuit of the rectifier in series with the control voltage a biasing voltage, the polarity of which is opposed to the polarity of the control voltage so that the current supplied to the load is automatically reduced in the event of failure of the amplifier space current device.

The invention will now be described with reference to the accompanying drawing the single figure of which is a diagrammatic view of a current supply apparatus embodying the invention.

Referring to the drawing, there is provided a current supply circuit for supplying direct current to a load 10 which may comprise the filament or filaments of one or more space current tubes, for example, and for minimizing load voltage changes. The source from which the current is supplied is a battery 11. The load voltage may be maintained at 6.3 volts plus or minus 5 per cent, for example, when the voltage of a nominally 6-volt battery 11 has considerably larger voltage variations. For limiting the load voltage changes, there are provided means for deriving from the battery a pulsating current which is supplied to the load circuit through a variable reactive device and means for controlling the reactance of the reactive device so as to cause load voltage changes to be minimized. There is provided a transformer 12 having primary windings 13 and 14 and secondary windings 15, 16 and 17. There is also provided a vibrating reed relay having a first pair of contacts 18, 19, a second pair of contacts 20, 21, a contact 22, a winding 23, and an armature 24 which is intermittently actuated in response to the intermittent energization of winding 23. The completion of an energizing circuit which may be traced from the positive terminal of battery 11 through relay 23, relay contact 22 and armature 24 to the grounded negative battery terminal causes the armature 24 to be actuated to cause the grounded terminals of the battery 11 and of the load 10 to be connected to the contacts 18 and 20. When the energization circuit for winding 23 is opened at contact 22 to cause the release of armature 24, the grounded armature is connected to contacts 19 and 21. Transformer windings 13 and 14 are connected in parallel aiding and mid-taps of windings 13 and 14 are conductively connected to the positive terminal of battery 11. Therefore when armature 24 is in its actuated position, a circuit is completed from the positive battery terminal through the upper portion of each of transformer windings 13 and 14 and through relay contact 18 and armature 24 to the negative battery terminal. When the relay armature is released, a circuit is completed from the positive battery terminal through the lower portion of each of transformer windings 13 and 14 and through contact 19 and armature 24 of the relay to the negative battery terminal. The resulting current flow in opposite directions alternately through the windings 13 and 14 causes alternating electromotive forces to be induced in secondary transformer windings 15, 16 and 17.

There is provided a ripple filter comprising an inductance element 30 connected in series with the load 10 and shunt condensers 31 and 32, each of 3,000 microfarads, for suppressing or reducing alternating components of a pulsating current supplied to the input of the filter. There is provided a saturable reactor comprising a three-legged core of magnetic material 33, windings 34 and 35 wound upon its outer legs, respectively, and a saturating winding 36 wound upon its middle leg. The inductance of each of windings 34 and 35 is increased in response to a reduction of direct current supplied to winding 36, and vice versa. The plates of a condenser 37 are connected to relay contacts 20 and 21 respectively. One end terminal of winding 15 is connected through reactor winding 34 to relay contact 20 and the other end terminal of winding 15 is connected through reactor winding 35 to relay contact 21. A mid-terminal of winding 15 is connected through inductance element 30 to the positive load voltage terminal. During half cycles of the alternating electromotive force set up across winding 15 when the mid-terminal of winding 15 is positive with respect to its upper terminal, current flows from the mid-terminal of transformer winding 15 through inductance element 30, through the load 10, through armature 24 and contact 20 of the relay and through reactor winding 34 to the upper terminal of transformer winding 15. During half cycles of the alternating electromotive force when the mid-tap of transformer winding 15 is positive with respect to the lower end terminal of winding 15, current flows from the mid-tap of winding 15 through inductance element 30, through the load 10, through armature 24 and contact 21 of the relay and through reactor winding 35 to the lower end terminal of transformer winding 15. There is thus supplied to the load circuit full wave rectified current which is filtered by the ripple filter 30, 31, 32.

Current is supplied to saturating winding 36 of the reactor from a full wave rectifier comprising a rectifier tube 40 (type 6SL7 or 6N7). The end terminals of transformer winding 16 are connected to the anodes respectively of tube 40. The circuit through which the rectified current is supplied to the reactor winding may be traced from the cathode of tube 40 through reactor winding 36 to a mid-tap of transformer winding 16. The control grid-cathode circuit of tube 40 comprises resistors 41 and 42 connected to the grids, respectively, a resistor 43 and a condenser 44. Condenser 44 is charged by current supplied from transformer winding 17 through rectifier elements 45 to set up a grid-biasing voltage across condenser 44. Resistor 43 is in a shunt current path connected across load 10 and inductance element 30 in series, this current path comprising the space current path of an amplifier tube 50 (type 6SJ7 or 6AK5), anode resistor 43 and a 90-volt direct current source 51 having its negative terminal grounded. While this source is shown as a battery 51, it may obviously be derived from battery 11 by means of an independent vibrator inverter-rectifier or from the plate supply of an associated radio set, for example. The polarity of the voltage across condenser 44 is such as to bias the grids of tube 40 negatively with respect to its cathode so that, when the voltage of battery 51 is reduced or when for some reason no space current is flowing in tube 50 and through resistor 43, the current supplied to reactor winding 36 is reduced below normal to thereby cause the reactance of windings 34 and 35 to be increased and the voltage across the load 10 to be decreased below normal. The voltage drop produced across resistor 43 when space current flows in tube 50 is opposed to the voltage drop across condenser 44 and is of sufficient magnitude that the resulting increased current flowing through reactor winding 36 causes the reactance of windings 34 and 35 to be reduced to such an extent that the load voltage is raised to normal value. It will be seen that if the circuit were differently designed so as to eliminate the biasing voltage across condenser 44 and to reverse the voltage across resistor 43 in the grid-cathode circuit of tube 40 so as to make the grids negative with respect to the cathode, interruption of space current in tube 50 due to damaging of the tube, for example, would have the undesired effect of raising the load voltage above normal and thus possibly result in burning out the filaments of vacuum tubes which may comprise the load 10.

An electromotive force having variations proportional to load voltage changes is impressed upon the control grid-cathode circuit of amplifier tube 50 to produce across resistor 43 a voltage having variations of increased magnitude corresponding to load voltage changes. The control grid-cathode circuit of tube 50 may be traced from the control grid through a variable portion of the resistance of a potentiometer 52 and through the load 10 and filter inductance element 30 to the cathode, a cold cathode, gas-filled constant voltage tube 53 (type 991 or NE16) being connected across the potentiometer 52. Current from source 51 is supplied to a circuit comprising a resistor 54 in series with tube 53. The tube 53 has the characteristic that the voltage across its terminals is maintained substantially constant irrespective of voltage changes of source 51. The voltage in the control grid-cathode circuit of tube 50 thus comprises the load voltage and, in opposition thereto, an adjustable portion of the substantially constant voltage across the tube 53. Positive potential with respect to the cathode potential is impressed upon the screen grid of tube 50 by connecting it to the common terminal of tube 53 and resistor 54.

When the voltage across the load 10 rises by a small amount, for example, the control grid of amplifier tube 50 is made relatively more negative with respect to its cathode, thus causing a reduction of the space current of tube 50 and a reduction of the voltage drop across resistor 43. As a result the control grids of rectifier tube 40 are made relatively more negative with respect to the tube cathode, thereby causing a reduction of rectified current supplied to the saturating winding 36 of the reactor. The reactance of reactor windings 34 and 35 is therefore increased and as a result the rectified current supplied to the load is reduced. The change of load voltage is thus minimized. Similarly, if the load voltage should decrease slightly, the reactance of windings 34 and 35 is decreased to limit the reduction of load voltage to a relatively small amount.

What is claimed is:

1. Means adapted to be energized by current from a direct current source the voltage of which may vary for supplying current to a load and for minimizing load voltage changes comprising means energized by current from said direct current source for setting up an undulating current, a filter, a saturable reactor having a plurality of windings, a circuit including a first winding of said reactor for supplying said undulating current to said filter, the load being connected across the output of said filter, and means for supplying to a second winding of said reactor to control the impedance of its first winding a current which varies inversely with respect to changes of load voltage for minimizing said load voltage changes.

2. The combination with a source of direct current the voltage of which may change aperiodically, a load and a circuit through which unidirectional current is supplied to said load, of means energized by current from said source for setting up and impressing upon said circuit a periodically pulsating voltage and means responsive to the load voltage for controlling the impedance of said circuit to minimize load voltage changes, said last-mentioned means comprising in said circuit a saturable reactor having a saturating winding and means under the control of the load voltage for supplying to said saturating winding a current which decreases in response to an increase of load voltage and vice versa.

3. A combination in accordance with claim 2 in which said current includes a filter for reducing alternating components of the current supplied by said circuit to the load.

4. In combination, a circuit for supplying current to a load in response to a voltage impressed upon said circuit, means energized by current from a direct current source the voltage of which may vary aperiodically for setting up and impressing upon said circuit a periodically pulsating voltage, a reactor having a first winding in series with said load with respect to said source of pulsating voltage and having a second winding to which current may be supplied to control the reactance of said first winding, means for supplying, to said second winding and means under control of the load voltage for controlling the current supplied to said second winding to cause said current to increase in response to a decrease in load voltage and vice versa for causing said load voltage changes to be minimized.

5. The combination with a circuit for supplying current to a load of means for inverting current from a source of direct current to cause to be set up an alternating voltage, means including a rectifier upon which said alternating voltage is impressed for supplying rectified alternating current to said load circuit, variable reactance means for controlling the amplitude of the rectified current supplied to said load circuit, said reactance means comprising a saturating winding, means for supplying current to said saturating winding, means for attenuating alternating components of the current supplied from said load circuit to said load, and means controlled by said load voltage for controlling said means for supplying current to said saturating winding, whereby the reactance of said reactance means is varied to minimize load voltage changes.

6. Means to which current is supplied from a battery the voltage across which may change for supplying direct current to a load and for maintaining the load voltage relatively constant, comprising a transformer having a primary and a secondary winding, means for causing current from said battery to flow through said primary alternately in opposite directions to induce an alternating voltage across said secondary winding, a load circuit for supplying current to said load, means for alternately connecting different portions respectively of said secondary winding to said load circuit in synchronism with the reversal of the current supplied to said primary, thereby impressing a pulsating unidirectional voltage upon said load circuit and causing pulsating current to flow in said load circuit, reactance means for controlling the amplitude of the pulsating current flowing in said load circuit, said reactance means comprising a saturating winding, means for supplying current to said saturating winding to control the reactance of said reactance means, filtering means for reducing or substantially eliminating alternating components of the current supplied from said load circuit to said load, and means under control of the load voltage for controlling said means for supplying current to said saturating winding.

7. A combination in accordance with claim 6 in which the means for reversing the current supplied to said transformer primary and the means for connecting the secondary winding to the load circuit comprises a vibrating relay having a vibratory armature and having means energized by current intermittently supplied thereto from said battery for actuating said armature.

8. Means to which current is supplied from a battery the voltage across which may change for supplying direct current to a load and for maintaining the load voltage relatively constant, comprising a transformer having a primary and a secondary winding, means for causing current from said battery to flow through said primary alternately in opposite directions to induce an alternating voltage across said secondary winding, a load circuit for supplying current to said load, means for alternately connecting different portions respectively of said secondary winding to said load circuit in synchronism with the reversal of the current supplied to said primary, thereby impressing a pulsating unidirectional voltage upon said load circuit and causing pulsating current to flow in said load circuit, reactance means for controlling the amplitude of the pulsating current flowing in said load circuit, filtering means for reducing or substantially eliminating alternating components of the current supplied from said load circuit to said load, means under control of the load voltage for controlling the reactance of said reactance means to thereby minimize load voltage variations, said reactance means comprising a saturating winding to which current may be supplied for controlling the reactance of said reactance means, said transformer having a second secondary winding, a rectifier for rectifying current supplied thereto from said second secondary winding, means for supplying rectified current from said rectifier to said saturating winding, said rectifier having a control means upon which a voltage may be impressed for controlling the amplitude of the rectified current supplied to said saturating winding, and means for deriving a voltage from said load circuit and for impressing said voltage upon said control means.

9. Means to which current is supplied from a battery the voltage across which may change for supplying direct current to a load and for maintaining the load voltage relatively constant, comprising a transformer having a primary and a secondary winding, means for causing current from said battery to flow through said primary alternately in opposite directions to induce an alternating voltage across said secondary winding, a load circuit for supplying current to said load, means for alternately connecting different portions respectively of said secondary winding to said load circuit in synchronism with the reversal of the current supplied to said primary, thereby impressing a pulsating unidirectional voltage upon said load circuit and causing pulsating current to flow in said load circuit, reactance means for controlling the amplitude of the pulsating current flowing in said load circuit, filtering means for reducing or substantially eliminating alternating components of the current supplied from said load circuit to said load, means under control of the load voltage for controlling the reactance of said reactance means to thereby minimize load voltage variations, said reactance means comprising a saturating winding to which current may be supplied for controlling the reactance of said reactance means, and means comprising a space current amplifying device for deriving a control voltage from said load circuit for controlling the supply of current to said saturating winding, the polarity of said control voltage being such that the supply of current to said saturating winding is decreased in response to a decrease of said control voltage resulting from a decrease of space current of said space current device.

DAVID E. TRUCKSESS.

No references cited.